(12) United States Patent
Salahat et al.

(10) Patent No.: US 9,489,578 B2
(45) Date of Patent: *Nov. 8, 2016

(54) HARDWARE ARCHITECTURE FOR REAL-TIME EXTRACTION OF MAXIMALLY STABLE EXTREMAL REGIONS (MSERS)

(71) Applicant: Khalifa University of Science, Technology and Research, Abu Dhabi (AE)

(72) Inventors: Ehab Najeh Salahat, Abu Dhabi (AE); Hani Hasan Mustafa Saleh, Abu Dhabi (AE); Andrzej Stefan Sluzek, Abu Dhabi (AE); Mahmoud Al-Qutayri, Abu Dhabi (AE); Baker Mohammad, Abu Dhabi (AE); Mohammed Ismail Elnaggar, Abu Dhabi (AE)

(73) Assignee: Khalifa University of Science, Technology and Research, Abu Dhabi (AE)

( * ) Notice: Subject to any disclaimer, the term of this patent is extended or adjusted under 35 U.S.C. 154(b) by 0 days.

This patent is subject to a terminal disclaimer.

(21) Appl. No.: 14/482,482

(22) Filed: Sep. 10, 2014

(65) Prior Publication Data

US 2016/0071280 A1 Mar. 10, 2016

(51) Int. Cl.
*G06K 9/00* (2006.01)
*G06K 9/46* (2006.01)

(52) U.S. Cl.
CPC ......... *G06K 9/00771* (2013.01); *G06K 9/4609* (2013.01); *G06K 9/4661* (2013.01); *G06T 2207/30232* (2013.01)

(58) Field of Classification Search
None
See application file for complete search history.

(56) References Cited

U.S. PATENT DOCUMENTS

| 7,027,054 | B1 | 4/2006 | Cheiky et al. |
| 7,725,484 | B2 * | 5/2010 | Nister ............... G06K 9/6282 707/706 |
| 7,813,561 | B2 * | 10/2010 | Jia .................. G06F 17/30247 382/155 |
| 8,265,866 | B2 * | 9/2012 | Altamura ............. G01C 21/20 701/409 |
| 8,295,604 | B2 | 10/2012 | Sakai et al. |
| 8,406,532 | B2 | 3/2013 | Wang et al. |
| 8,538,077 | B2 * | 9/2013 | Zitnick, III ......... G06K 9/4623 382/103 |

(Continued)

OTHER PUBLICATIONS

Varah, Sarah (target detection and tracking using a parallel implementation of maximally stable extremal region ),Mar. 19, 2013.*

(Continued)

*Primary Examiner* — Nancy Bitar
(74) *Attorney, Agent, or Firm* — Withrow & Terranova, P.L.L.C.

(57) ABSTRACT

Hardware architecture for real-time extraction of maximally stable extremal regions (MSERs) is disclosed. The architecture includes a communication interface and processing circuitry that are configured in hardware to receive a data stream of an intensity image in real-time and provide labels for image regions within the intensity image that match a given intensity threshold. The communication interface and processing circuitry are also configured in hardware to find extremal regions within the intensity image based upon the labels and to determine MSER ellipses parameters based upon the extremal regions and MSER criteria. In at least one embodiment, the MSER criteria include minimum and maximum MSER areas, and an acceptable growth rate value for MSER area. In another embodiment, the MSER criteria include a nested MSER tolerance value.

31 Claims, 7 Drawing Sheets

(56) References Cited

U.S. PATENT DOCUMENTS

| | | | |
|---|---|---|---|
| 9,053,361 B2* | 6/2015 | Baheti | G06K 9/00456 |
| 2014/0286579 A1* | 9/2014 | Grujic | G06K 9/00986 382/203 |

OTHER PUBLICATIONS

Donoser, M., et al., "Efficient Maximally Stable Extremal Region (MSER) Tracking," Proceedings of the 2006 IEEE Computer Society Conference on Computer Vision and Pattern Recognition, Jun. 2006, 8 pages.

Donoser, M., et al., "Shape Guided Maximally Stable Extremal Region (MSER) Tracking," 20th International Conference on Pattern Recognition, Istanbul, Aug. 2010, pp. 1800-1803.

Greenhalgh, J., et al., "Real-Time Detection and Recognition of Road Traffic Signs," IEEE Transactions on Intelligent Transportation Systems, vol. 13, No. 4, Dec. 2012, pp. 1498-1506.

Hsu, G.-S., et al., "Application-Oriented License Plate Recognition," IEEE Transactions of Vehicular Technology, vol. 62, No. 2, Feb. 2013, pp. 552-561.

Huang, L., et al., "Human Skin Detection in Images by MSER Analysis," 18th IEEE International Conference on Image Processing, Brussels, Sep. 2011, pp. 1257-1260.

Riemenschneider, H., et al., "Online Object Recognition by MSER Trajectories," 19th International Conference on Pattern Recognition, Tampa, FL, Dec. 2008, 4 pages.

Sivic, J., et al., "Video Google: A Text Retrieval Approach to Object Matching in Videos," Proceedings of the Ninth IEEE International Conference on Computer Vision, Nice, France, Oct. 13-16, 2003, 8 pages.

Varah, S., et al., "Target Detection and Tracking Using a Parallel Implementation of Maximally Stable Extremal Region," GPU Technology Conference, Canada, Mar. 2013, 28 pages.

Notice of Allowance for U.S. Appl. No. 14/482,629, mailed Nov. 19, 2015, 8 pages.

Kristensen, Fredrik et al., "Real-Time Extraction of Maximally Stable Extremal Regions on an FPGA," 2007 IEEE International Symposium on Circuits and Systems, May 2007, IEEE, pp. 165-168.

Non-Final Office Action for U.S. Appl. No. 14/686,905, mailed Apr. 21, 2016, 5 pages.

\* cited by examiner

| SeedsList | Seed#1 | Seed#2 | Seed#3 | Seed#4 | BLANK |
|---|---|---|---|---|---|
| $|Q(t-\Delta)|$ | 25 | 49 | 102 | 4 | BLANK |
| $|Q(t)|$ | 120 | 120 | 135 | 11 | BLANK |
| $|Q(t+\Delta)|$ | 155 | 155 | 173 | 44 | BLANK |

| SeedsList | Seed#1 | Seed#2 | Seed#3 | Seed#4 | Seed#5 |
|---|---|---|---|---|---|
| $|Q(t-\Delta)|$ | 120 | 120 | 135 | 11 | 1 |
| $|Q(t)|$ | 155 | 155 | 173 | 44 | 1 |
| $|Q(t+\Delta)|$ | 203 | 203 | 244 | 244 | 13 |

| SOC Architecture Requirements Summary | |
|---|---|
| Frame Resolution | 160x120=19200 |
| Memory (Kbytes) | 84 |
| Addition Operations (in Millions) | 10.2776 |
| Product Operations (in Millions) | 0.8206 |
| Memory Read (in Millions) | 34.0631 |
| Memory Write (in Millions) | 33.7197 |
| Estimated Power (µW) | TBD |

HARDWARE ARCHITECTURE FOR REAL-TIME EXTRACTION OF MAXIMALLY STABLE EXTREMAL REGIONS (MSERS)

RELATED APPLICATIONS

The present application is related to concurrently filed U.S. patent application Ser. No. 14/482,629, entitled "ARCHITECTURE AND METHOD FOR REAL-TIME PARALLEL DETECTION AND EXTRACTION OF MAXIMALLY STABLE EXTREMAL REGIONS (MSERs)."

FIELD OF THE DISCLOSURE

The present disclosure relates to computer vision and automated surveillance systems.

BACKGROUND

Visual surveillance of dynamic scenes is an active area of research in robotics and computer vision. The research efforts are primarily directed towards object detection, recognition, and tracking from a video stream. Intelligent visual surveillance has a wide spectrum of promising governmental and commercial-oriented applications. Some important applications are in the field of security and include access control, crowd control, human detection and recognition, traffic analysis, detection of suspicious behaviors, vehicular tracking, Unmanned Aerial Vehicle (UAV) operation, and detection of military targets. Many other industrial applications in the automation fields also exist, such as faulty products detection, quality assurance, and production line control.

Commercial surveillance systems are intended to report unusual patterns of motion of pedestrians and vehicles in outdoor environments. These semi-automatic systems intend to assist, but not to replace, the end-user. In addition, electronics companies provide suitable equipment for surveillance. Examples of such equipment include active smart cameras and omnidirectional cameras. All the above provide evidence of the growing interest in visual surveillance, where, as in many image processing applications, there is a crucial need for high performance real-time systems. A bottleneck of these systems is primarily hardware-related, including capability, scalability, requirements, power consumption, and ability to interface various video formats. In fact, the issue of memory overhead prevents many systems from achieving real-time performance, especially when general purpose processors are used. In these situations, the typical solutions are either to scale down the resolution of the video frames or to inadequately process smaller regions of interests within the frame.

Although Digital Signal Processors (DSPs) provide improvement over general purpose processors due to the availability of optimized DSP libraries, DSPs still suffer from limited execution speeds. Thus, DSPs are insufficient for real-time applications. Field programmable gate array (FPGA) platforms, on the other hand, with their inherently parallel digital signal processing blocks, large numbers of embedded memory and registers, and high speed memory, together with storage interfaces, offer an attractive solution to facilitate hardware realization of many image detection and object recognition algorithms. As a result, computationally-expensive algorithms are usually implemented on an FPGA.

State-of-the-art developments in computer vision confirm that processing algorithms will make a substantial contribution to video analysis in the near future. The processing algorithms once commercialized may overcome most of the issues associated with the power and memory-demanding needs. However, the challenge to devise, implement, and deploy automatic systems using such algorithms to detect, track, and interpret moving objects in real-time remains. The need for real-time applications is strongly felt worldwide, by private companies and governments directed to fight terrorism and crime, and to provide efficient management of public facilities.

Intelligent computer vision systems demand novel system architectures capable of integrating and combining computer vision algorithms into configurable, scalable, and transparent systems. Such systems inherently require high performance devices. However, many uncharted areas remain unaddressed. For example, only a single hardware implementation attempt has been reported for a Maximally Stable Extremal Regions (MSERs) detector and the attempt had limited success. This is in spite of the fact that MSERs detectors were introduced as a research topic more than a decade ago, have been used in numerous software applications, and discussed in over 3,000 published papers. The major advantages of MSERs are affine invariance. Traditional scale invariant feature transform (SIFT) detectors and speeded up robust features (SURF) detectors are only scale and rotation invariant.

What is needed is a hardware architecture for real-time extraction of MSERs. The architecture can be easily realized with e.g. an FPGA or an application specific integrated circuit (ASIC) or the like.

SUMMARY

A hardware architecture for real-time extraction of maximally stable extremal regions (MSERs) is disclosed. The hardware architecture includes a communication interface and processing circuitry that are configured in hardware to receive a data stream of an intensity image in real-time and provide labels for image regions within the intensity image that match a given intensity threshold. The communication interface and processing circuitry are also configured in hardware to find extremal regions within the intensity image based upon the labels as well as determine MSER ellipses parameters based upon the extremal regions and MSER criteria.

In at least one embodiment, the MSER criteria include minimum MSER area, maximum MSER area, the acceptable growth rate value for MSER area, (i.e. maximum region area variation), and threshold increment parameter (step size between consecutive threshold values). In another embodiment, the MSER criteria include a nested MSER tolerance value.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 1 is a block diagram, of the proposed architecture for real-time extraction of maximally stable extremal regions (MSERs) that is in accordance with the present disclosure, which can be easily used in System-on-Chip (SoC) platforms or the like.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
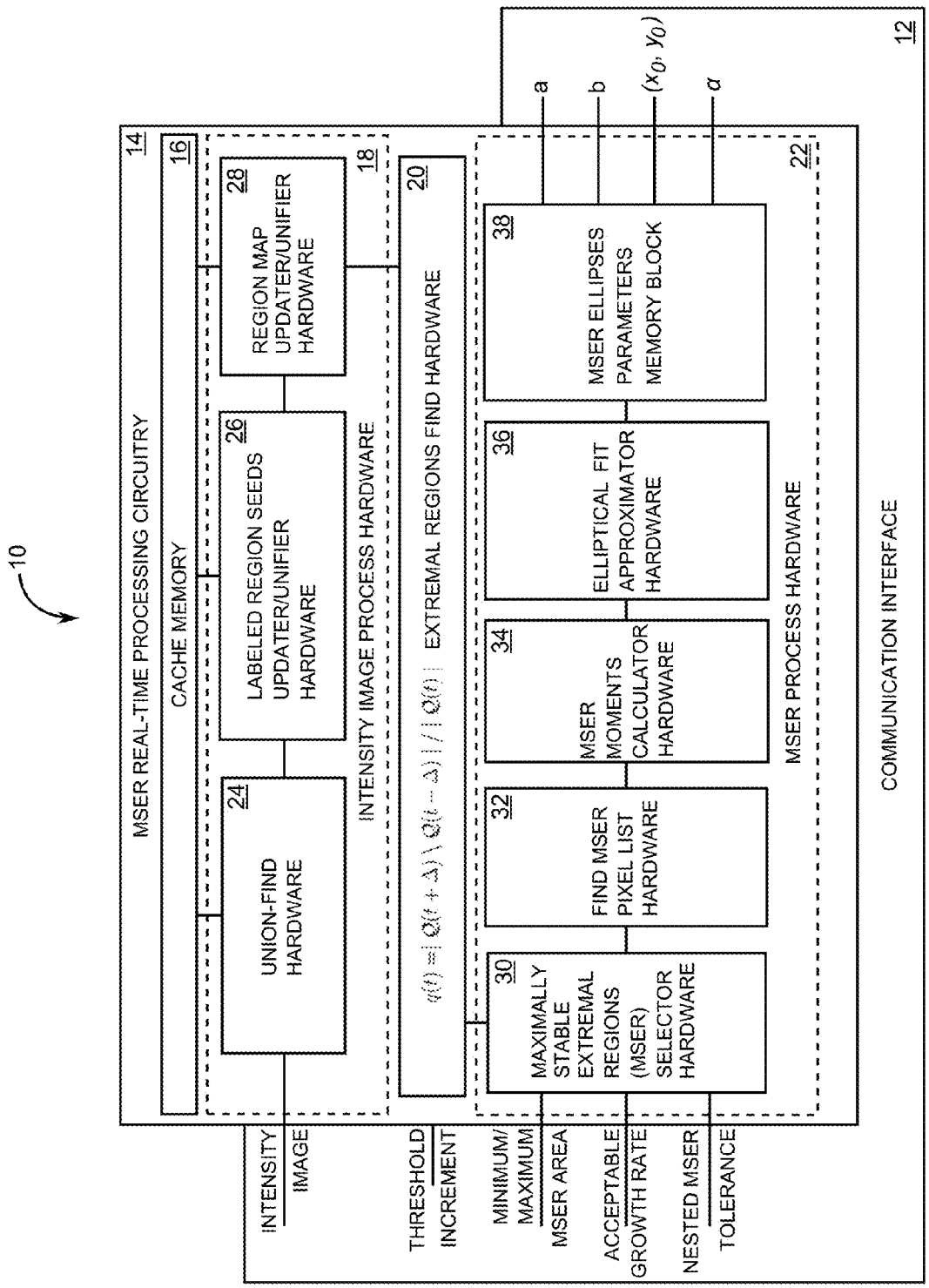

FIG. 1 is a block diagram of an architecture 10 for real-time extraction of maximally stable extremal regions (MSERs). The architecture 10 includes a communication interface 12 and MSER real-time processing circuitry 14. In an exemplary embodiment, a cache memory 16 is usable to store data resulting from MSER processing performed by the MSER real-time processing circuitry 14. For the purpose of this disclosure, the architecture combines the required electronic circuits of various hardware implemented functions and memory needed to realize the architecture 10 onto a single integrated chip (IC) and as a complete system. An architecture 10 platform can be realized on (System-on-Chip) SoCs, a field programmable gate array (FPGA), an application specific integrated circuit (ASIC) or the like.

The MSER real-time processing circuitry 14 includes intensity image process hardware 18 that receives a data stream of an intensity image via the communications interface 12 and provides labels for image regions within the intensity image that match a given intensity threshold. Also included is extremal regions find hardware 20 that finds extremal regions within the intensity image based upon the labels. During operation, the extremal regions find hardware 20 that automatically monitors the size of each extremal region, i.e., each extremal region's cardinality, $|Q(t)|$, as a function of an intensity threshold value t. An MSER is detected if q(t) has a local minimum, where $$q(t)=|Q(t+\Delta)\backslash Q(t-\Delta)|/|Q(t)|. \quad \text{EQ. 1}$$

Detected MSERs are further processed by MSER process hardware 22 to extract MSERs of particular interest. The details of the MSER process hardware 22 is discussed later in this disclosure.

In an exemplary embodiment, an incoming frame of the intensity image is intensity thresholded to generate a binary image made up of dark pixels and bright pixels at full contrast. In an exemplary embodiment, the intensity threshold value t starts at zero and increments at a given intensity threshold increment $\Delta$ until the intensity threshold value equals 255. Therefore, if $\Delta$ is set to 5, there will be 52 intensity thresholding processes per intensity image frame. Further still, with $\Delta$ increments, the threshold continues to increase until the entire intensity image is processed. In general, the thresholding process requires $255/\Delta A+1$ threshold increments. Typical values of $\Delta$ range from around about 4 to around about 8. Therefore, around about 64 to around about 8 threshold increments are needed to process a complete intensity image. There is a binary image for each threshold increment, and light regions and dark regions are labeled for each In an exemplary embodiment, the intensity image process hardware 18 includes union-find hardware 24 (which can be replaced with other labeling/segmentation algorithms hardware with some extra processings, i.e. the union-find is just an example for a useful algorithm that can be used with the MSER, to the best of our knowledge and as was reported by the inventor of the MSER algorithm, the best MSER implementation can be achieved using the union-find algorithm and hence is reported here), that labels image regions within the intensity image for each $\Delta$ of the intensity threshold value t. In particular, the union-find hardware 24 labels regions within the binary image for each intensity threshold of the intensity image. Moreover, the union-find hardware 24 will provide a labeled image, a seed, and a size (i.e., the number of pixels with a same label) of each region plus the number of labels used. Simply put, the union-find hardware 24 provides labeled regions and their corresponding sizes and seeds. The seed of each region at a particular intensity threshold is the first pixel location that the union-find hardware 24 finds for the region. Due to the intensity threshold increment $\Delta$, previous regions may grow or merge and new regions may appear. As a result, the union-find hardware 24 will label such regions with labels that are still unique but not necessarily similar to previous labels or with the same seeds. Furthermore, because the regions can grow and/or merge, the first pixel location that the union-find hardware 24 encounters for a growing region will be different from a previous seed, even though both refer to the same region. To overcome this problematic issue, labeled region seeds updater/unifier hardware 26 compares all seeds stored as a seed list in the cache memory 16 for a present intensity threshold to seeds previously detected and stored in the seed list. If a match between seeds is found, the original seed is maintained by the labeled region seeds updater/unifier hardware 26. Otherwise, the labeled region seeds updater/unifier hardware 26 appends a new seed to the seeds list stored in the cache memory 16.

A region map is usable to store region sizes for the seeds in the seeds list. The region map is stored as a dedicated portion of the cache memory 16. Region map updater/unifier hardware 28 updates the region map as the intensity image is processed by the union-find hardware 24.

The amount of memory that is needed to store the seeds' region sizes is 3 times the number of seeds stored in the SeedList memory because the region map stores the value of $Q(t+\Delta)$, $Q(t)$, and $Q(t-\Delta)$ for each seed. These values are needed to calculate the stability function for each seed in the SeedList. The region map allows for memory reduction and efficiency in place of recording a region size for every seed in the SeedList at every intensity threshold. As a result, if more seeds are appended to the SeedList at intensity threshold L+Δ, then new locations for this new seed are also appended to the RegionMap, where the region size for this intensity threshold is added in the q(t)=|Q(t+Δ)| while |Q(t)| and |Q(t−Δ)| are filled with ones to avoid division by zero. Note, that since |Q(t+Δ)| is not available at the current intensity threshold t, nor is t available for the first intensity threshold, then the calculation of q(t) starts at the third intensity threshold, i.e., q(t) is calculated at intensity threshold t+Δ, excluding the first and final intensity threshold values. In this way, the RegionMap memory has three rows to allow the stability function to be easily calculated. To elaborate on this, consider the following sample scenario table shown in FIG. 2A. At the third intensity threshold, in FIG. 2A, q(t) is calculated for the second intensity threshold. At |Q(t)|, the two regions defined by Seed#1 and Seed#2 merge, so they have the same size from then on. At the fourth intensity threshold, in FIG. 2B, q(t) is calculated for the third intensity threshold, and note that |Q(t+Δ)| and |Q(t)| at the third intensity threshold are |Q(t)| and |Q(t−Δ)| at the fourth intensity threshold. Because of the detection of a new region, defined by Seed#5, the RegionMap list is appended and the size of this new region at |Q(t+Δ)| is filled with its size, while |Q(t)| and |Q(t−Δ)| are filled with ones. At this intensity threshold, regions referred to by Seed#3 and Seed#4 merge so they will have the same region size from now on, etc. Note that at the final intensity threshold, all regions will merge into one with a size M×N.

The communication interface 12 receives MSER criteria that in at least one embodiment includes a minimum MSER area value MinArea, a maximum MSER area value MaxArea, and an acceptable growth rate value MaxGrowth. The minimum MSER area is the minimum number of pixels that an MSER can contain. In contrast, the maximum MSER area is the maximum number of pixels that an MSER can contain. As such, all detected MSERs must satisfy the condition:

$$\text{MinArea} \leq Q \leq \text{MaxArea}. \quad \text{EQ. 2}$$

The communication interface 12 passes the MSER criteria to MSER selector hardware 30, which also receives MSERs found via the extremal regions find hardware 20. The MSER selector hardware 30 in turn tests each MSER to ensure that each MSER has an area that fits within the range specified by the minimum MSER area value MinArea and the maximum MSER area value MaxArea.

The maximum acceptable growth rate value MaxGrowth specifies how stable the detected MSERs must be. In particular, all detected MSERs must satisfy the condition:

$$q(t) = |Q(t+\Delta) \backslash Q(t-\Delta)| / |Q(t)| \leq \text{MaxGrowth}. \quad \text{EQ. 3}$$

The communication interface 12 passes maximum acceptable growth rate value MaxGrowth to the MSER selector hardware 30, which in turn tests each MSER found by the extremal regions find hardware 20 to ensure that each MSER does not exceed the maximum acceptable growth rate value MaxGrowth.

In one embodiment, the MSER criteria also include a nested MSER tolerance value τ that is provided to mitigate sensitivity to blur and to mitigate discretization effects that plague traditional MSER extraction software and/or hardware. Since nested MSERs have similar center coordinates, any new MSERs with centers within a range associated with the tolerance value τ compared to previously detected and stored MSERs are excluded automatically. In particular, all detected MSERs satisfy the following conditions:

$$x_0 : \epsilon\{(1-0.5\tau)x_i, (1+0.5\tau)x_i\}, \quad \text{EQ. 4}$$

$$y_0 : \epsilon\{(1-0.5\tau)y_i, (1+0.5\tau)y_i\}, \quad \text{EQ. 5}$$

where $x_i$ and $y_i$ denote all previously stored center values of the detected MSERs. However, comparing centers has a drawback in that unnecessary computations are included while image moments are calculated. In order to predict possible nesting, and hence save unnecessary operations due to comparing centers, an alternative approach is executed by the MSER selector hardware 30 at a relatively far lower computational cost. Specifically, for each region, the MSER selector hardware 30 compares a current growth rate with a previous growth rate, and if an absolute difference is within a range defined by the tolerance value τ, then this region at the current intensity threshold is excluded by the MSER selector hardware from further MSER extraction processing. Moreover, an exemplary intensity threshold increment, Δ, may be selected as 5 to speed up the MSER detection process. MSER detection with Δ equal to 5 is around about five times faster than when Δ is equal to 1. Further still, since merged regions will have the same growth rate from the intensity threshold level as they merge, only one MSER that corresponds to the region with a seed that comes first in the seed list will be detected. The remaining MSERs will not be processed, but instead will be ignored. As a result of ignoring the remaining MSERs, many other unnecessary computations are eliminated to further save energy and execution time.

Find MSER pixel list hardware 32 generates a pixel list for the x and y coordinates for each labeled region defined by the labeled regions seed stored in the seed list for every MSER that passes the conditions tested by the MSER selector hardware 30. MSER moments calculator hardware 34 uses the pixel list to calculate region moments using the following relationship for any particular moment $m_{pq}$.

$$m_{pq} = \Sigma_{(x,y) \in R} x^p y^q, \quad \text{EQ. 6}$$

$$x, y \in R(\tau) \quad \text{EQ. 7}$$

where x and y denote the pixel coordinate of the region R(τ) at the current intensity threshold. Subsequently, the region can be approximated by a best-fit ellipse equation that is given by:

$$\frac{(x - x_0 + \tan(\alpha)(y - y_0))^2}{a^2(1 + \tan(\alpha))^2} + \frac{((y - y_0 + \tan(\alpha)(x - x_0))^2}{b^2(1 + \tan(\alpha))^2} = 1, \quad \text{EQ. 8}$$

where $(x_0, y_0)$, a, b, and α, respectively, are MSER ellipse parameters that represent a center of gravity (center of the MSER ellipse), a major axis length, a minor axis length, and an angle of the major axis with respect to a horizontal axis. In an exemplary embodiment, the MSER ellipse parameters are determinable using region moments $m_{00}$, $m_{10}$, $m_{10}$, $m_{02}$, and $m_{20}$ that are calculated by MSER moments calculator hardware 34. Elliptical fit approximator hardware 36 uses the region moments provided by the MSER moments calculator hardware 34 to approximate the MSER ellipse parameters $(x_0, y_0)$, a, b, and α via the following mathematical relationships.

$$x_0 = \frac{m_{10}}{m_{00}}, \quad \text{EQ. 9}$$

$$y_0 = \frac{m_{01}}{m_{00}}, \quad \text{EQ. 10}$$

-continued $$a = \sqrt{2\left(t_1 + t_3 + \sqrt{t_2^2 + (t_3 - t_1)^2}\right)},$$  EQ. 11

$$b = \sqrt{2\left(t_1 + t_3 - \sqrt{t_2^2 + (t_3 - t_1)^2}\right)},$$  EQ. 12

$$\alpha = 0.5\tan^{-1}\left(\frac{t_2}{t_1 - t_3}\right),$$  EQ. 13 where $$t_1 = \frac{m_{20}}{m_{00}} - x_0^2,$$  EQ. 14

$$t_2 = 2\left(\frac{m_{11}}{m_{00}} - x_0 y_0\right),$$  EQ. 15

$$t_3 = \frac{m_{02}}{m_{00}} - y_0^2,$$  EQ. 16

Instead of storing each MSER pixels list, which would require a relatively huge memory, an MSER ellipses parameters memory block 38 is usable to store best-fit ellipses parameters ($x_0$, $y_0$), a, b, and $\alpha$, which are provided to external hardware (not shown) for display or monitoring. For example, since the best-fit ellipses parameters ($x_0$, $y_0$), a, b, and $\alpha$ are readily available through the communication interface 12, they can be used to compute scale invariant feature transform (SIFT) descriptors and speeded up robust features (SURF) descriptors. Depending on whether or not the intensity image is inverted, the SOC architecture 10 will detect and extract either bright or dark MSERs.

Figures 2A, 2B, 3:
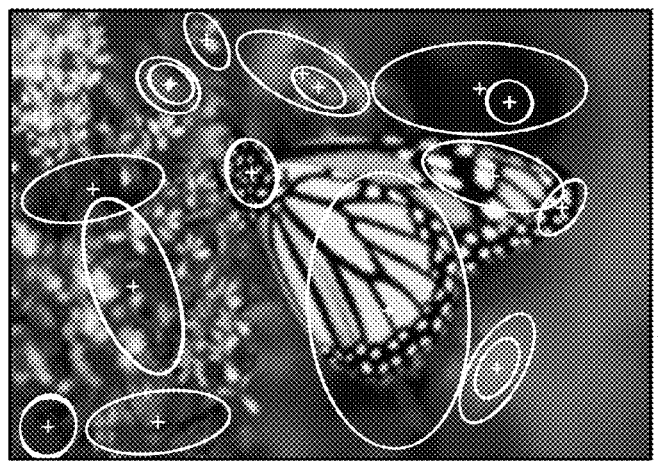
FIG. 2A is a sample scenario table for a seed list at a third intensity threshold.
FIG. 2B is an updated sample scenario table for the seed list at a fourth intensity threshold.
FIG. 3 is a test image displaying ellipses for MSERs detected and extracted from the test image.

FIG. 3 is a test intensity image displaying a sample of MSERs that were detected by the SOC architecture 10 of the present disclosure. The MSERs are contained or mostly contained within the white ellipses. Note that some of the MSERs are nested and are represented by ellipses within other ellipses. Crosshairs designate the center of each ellipse. Some nested MSERs are represented by concentric ellipses. It is to be understood that the number of ellipses representing MSERs in FIG. 3 are relatively few only for the purpose of simplified illustration. Relatively many more MSERs are typically detectable during operation of the SOC architecture 10.

Figure 4:
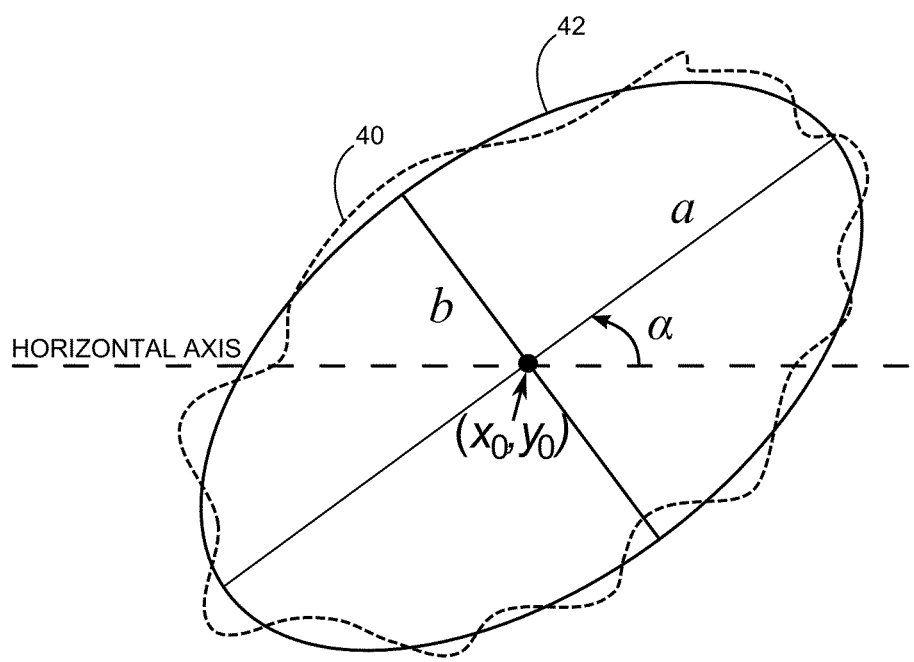
FIG. 4 is an exemplary contour sketch of an irregularly-shaped MSER with a best-fit elliptical approximation.

FIG. 4 is an exemplary contour sketch of an irregularly shaped MSER 40 with a best-fit elliptical approximation 42. Note that since merging regions will cause the same region sizes to be stored for multiple seeds, multiple detections referring to the same MSER may occur. To avoid this, only the first seed for the merged regions is used by the MSER process hardware 22 during operation, as discussed above.

Figure 5:
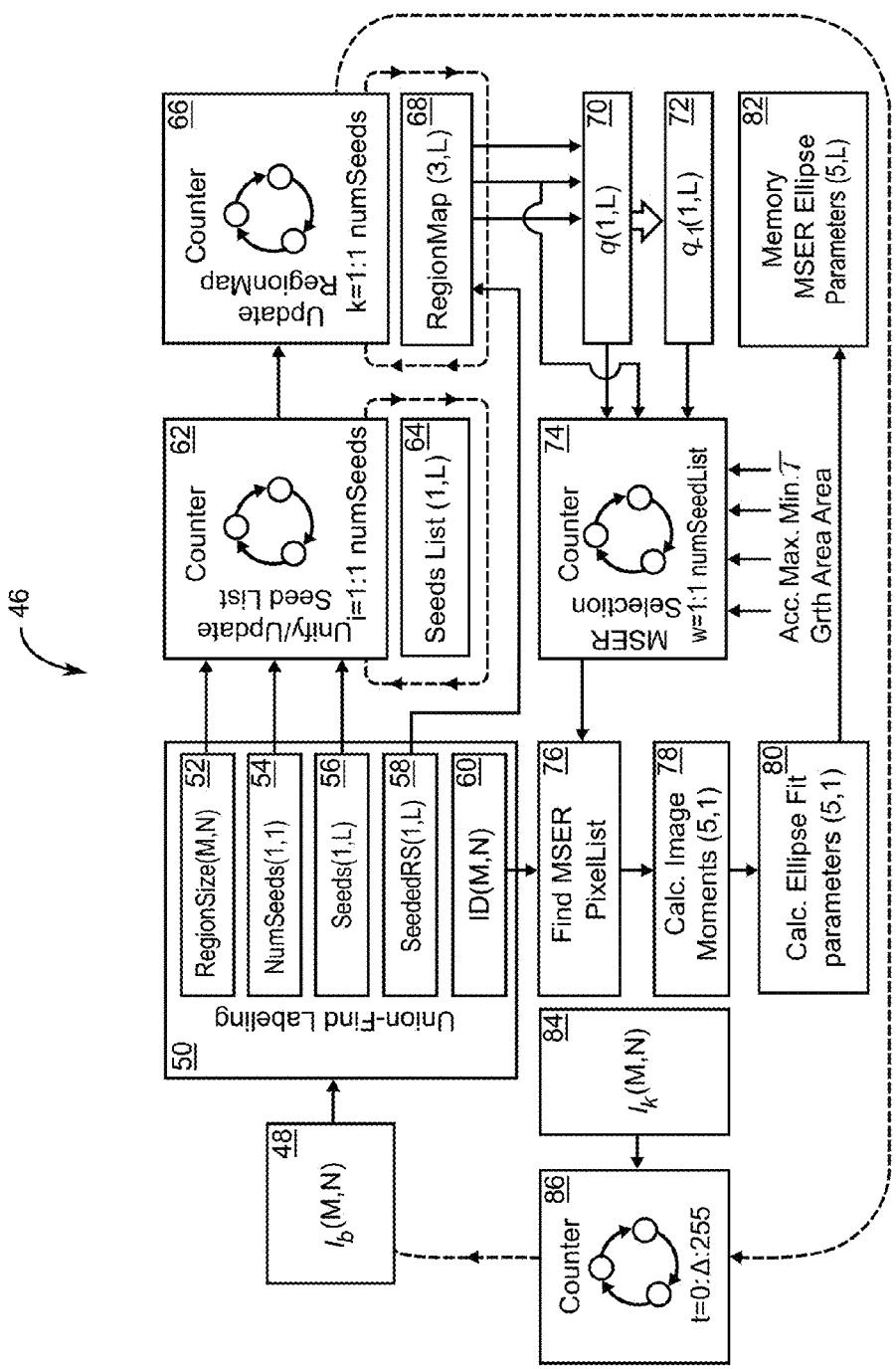
FIG. 5 is a diagram for a process flow for the MSERs processing hardware of FIG. 1.

FIG. 5 is a diagram for a process flow 46 for the MSER real-time processing circuitry 14 (FIG. 1). Note that dashed lines represent loop operations. The MSER real-time processing circuitry 14 reserves a memory block 48 having M rows and N columns to store an M×N binary (i.e., intensity threshold) image derived for the intensity image. A union-find labeling process 50 that generates a region size array 52, a number of seeds variable 54, a list of seeds 56, a seeded region size list 58 that includes the seed and the size (i.e., the number of pixels with the same label) of each region, and a labeled image array 60.

The labeled region seeds updater/unifier hardware 26 (FIG. 1) implements a finite state machine (FSM) 62 that monitors the labels of regions to relate them according to their previous label values in order to maintain tracking of the same region's seeds and sizes to ensure proper MSER detection. If the current intensity threshold includes a region that has a different seed from the previous intensity threshold value, the previous seed is maintained; otherwise a new seed is appended to a seed list 64 by FSM 62.

The region map updater/unifier hardware 28 (FIG. 1) implements an update region map FSM 66 that is labeled in FIG. 5 as Update RegionMap. After unifying and updating the seed list 64, the FSM 66 maps the number of pixels in a region of each monitored region having a seed stored in the seed list 64. The mapping performed by the FSM 66 results in a region map array 68 that is, in this exemplary embodiment, named RegionMap (3,L). The region map array 68 is a 3×L array stored in cache memory 16.

In this exemplary embodiment, the region map array 68 stores the region size of each region having a seed in the seed list 64 for the current intensity threshold value and the previous two intensity threshold values. This is sufficient to calculate the growth rate or stability function of each region that is used to identify MSERs. Note that the stability function is defined as:

$$q(t) = |Q(t+\Delta) \backslash Q(t-\Delta)| / |Q(t)|$$  EQ. 17 and $Q(t+\Delta)$, $Q(t)$, and $Q(t-\Delta)$ are stored for every seeded region in the region map array 68. A q(t) memory array 70 is usable to store the results of the stability function at the current intensity threshold. A q(t−$\Delta$) memory array 72 is usable to store the results of the stability function at the current intensity threshold minus $\Delta$.

The MSER selector hardware 30 (FIG. 1) implements an MSER selection FSM 74 that performs selection of MSERs based on the values stored in the q(t) memory array 70 and q(t−$\Delta$) memory array 72, along with MSER criteria received via the communications interface 12 (FIG. 1). The MSER criteria pertaining to the minimum MSER area value MinArea and the maximum MSER area value MaxArea are used by the MSER selection FSM 74 to exclude relatively too small MSERs and to exclude relatively too large MSERs. All MSERs Q detected by the MSER selection FSM 74 satisfy the following relationship:

$$\text{MinArea} \leq Q \leq \text{MaxArea}$$  EQ. 18

The MSER selection FSM 74 uses the third parameter that pertains to the maximum acceptable growth rate value MaxGrowth to monitor the stability of the detected MSERs, which must satisfy the following relationship:

$$q(t) - |Q(t+\Delta) \backslash Q(t-\Delta)| / |Q(t)| \leq \text{AccGrth}$$  EQ. 19

Moreover, the MSER selection FSM 74 compares the growth rate of q(t) and q(t−1). If the comparison does not exceed the nested MSER tolerance value $\tau$ then a nested MSER is detected and the MSER selection FSM 74 will not detect that particular nested MSER again.

The find MSER pixel list hardware 32 implements a find MSER pixel list function 76 that scans the binary image to locate all pixels belonging to each MSER detected. Afterwards, the MSER moments calculator hardware 34 implements a calculate image moments function 78 that calculates the region moments $m_{00}$, $m_{10}$, $m_{10}$, $m_{11}$, $m_{02}$, and $m_{20}$ that are stored in a 5×1 memory array stored in the cache memory 16 (FIG. 1). Next, the elliptical fit approximation hardware 36 implements a calculate ellipse fit parameters function 80 that calculates the best-fit ellipses parameters ($x_0$, $y_0$), a, b, and $\alpha$, which are stored in the MSER ellipses parameters memory block 38 via a memory MSER parameters store parameters function 82. The MSER parameters are stored using a 5×L memory array.

An intensity image store function implemented by the MSER real-time processing circuitry 14 allocates a memory array $I_k(M,N)$ 84 within the cache memory 16. The MSER real-time processing circuitry 14 also implements an FSM 86 that uses values from the memory array $I_k(M,N)$ to perform an intensity thresholding of the intensity image at every intensity threshold encountered for each intensity threshold increment $\Delta$.

Figure 6:
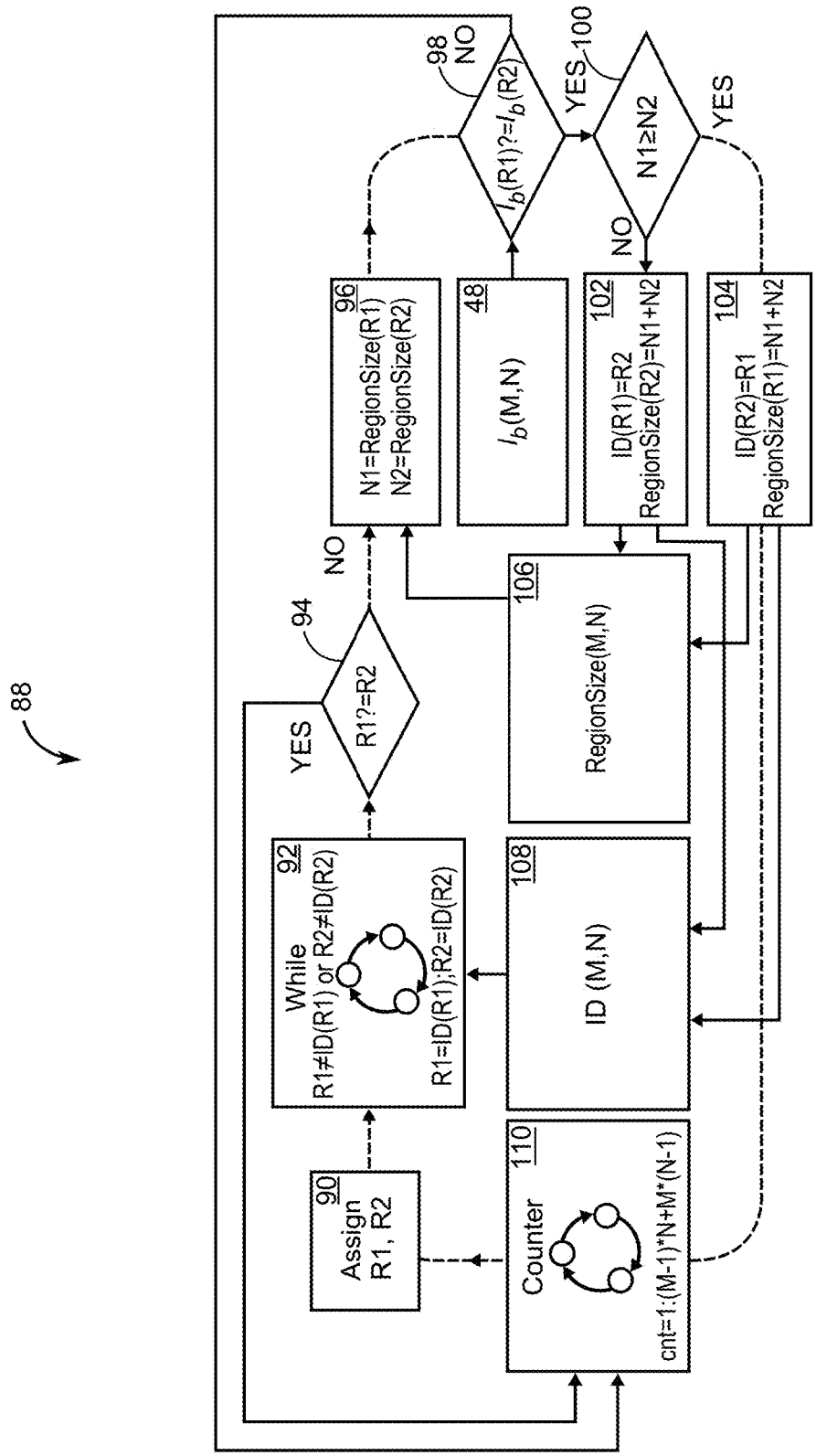
FIG. 6 is a diagram for a process flow for the union-find processing hardware of FIG. 1.

FIG. 6 is a process flow 88 for the union-find hardware 24 (FIG. 1). Note dashed lines represent loop operations. In particular, the union-find hardware 24 implements an assign function 90 that assigns two relatively well-defined values for a pair of region roots (R1, R2) needed for the union-find labeling in accordance with the present disclosure. Note that the region roots (R1, R2) address two adjacent pixel identification (ID) memory addresses.

A first union-find FSM 92 compares the assigned region roots (R1, R2) to stored values at ID memory addresses. The first union-find FSM 92 makes the region roots (R1, R2) the same if the first union-find FSM 92 determines that the region roots (R1, R2) are different. As the first union-find FSM 92 operates, yet another comparison is made by a first decision diamond 94 to test if the region roots (R1, R2) are the same. If no, the process continues with an assignment function 96 that assigns two variables (N1, N2) with two values respectively, with the stored values at the ID memory addresses for region roots (R1, R2) that correspond to the region size of a collective region defined by the region roots (R1, R2).

A second decision diamond 98 compares two adjacent pixels specified by the region roots (R1, R2) to determine if the two adjacent pixels have the same value. If no, then there is no change. However, if yes, then the two adjacent pixels are connected and the process continues to a third decision diamond 100 that tests to see if N1 is greater than or equal to N2. If no, the process continues with a first merge block 102 that merges N1 and N2 into the region R2, which is relatively larger than region R1. If yes, the process continues with a second merge block 104 that merges N1 and N2 into the region R1. The first merge block 102 and the second merge block 104 communicate with a region size memory array 106 that has M×N elements and is named RegionSize (M,N) in the exemplary embodiment of FIG. 6. A uniquely labeled image is stored within an ID matrix 108. Unlike the region size memory array 106 that is labeled using each region number of pixels in which two regions might coincidentally have the same region size and hence the same label in the ID matrix 108. Labels in the ID matrix 108 are unique and each label reflects the root of the associated region. In other words, since each region has just one root, each label is unique.

A region roots assignment FSM 110 continues assigning values for the region roots (R1, R2) and continues operating for every intensity threshold until all pixels are labeled. Each root (i.e. each of R1 and R2) is assigned $M*(N-1)+N*(M-1)$ times.

A total memory requirement for a frame of M×N and a maximum number of L detected MSERs, the memory requirement can be approximated as: Total Memory Requirement≈M×N [intensity image]+0.125×M×N [binary image, one bit per location is sufficient]+2×k×M×N [ID+RegionSize]+4×L [Seeds List+RegionMap]+5×L [elliptical parameters]+2×L [q(t) and q(t−1)]=[1.125+2×k]×M×N+11×L, where k is a constant that ensures proper assignment for both RegionSize and ID, not larger than 3 to support 4096×4096 image resolution, which is, again, far more than needed in practice.

The total memory requirement is an upper limit approximation that is recommended because of the impossibility to predict the number of MSERs in an image, since the number of MSERs is highly dependent on the content of the image. The memory requirement is only about 104 kBytes for a 160×120 frame (and assuming the constant k=2), and a maximum of 768 detected MSERs, which is relatively far more than the typical number of detected MSERs in images. If we assume an image resolution of 320×240, just as used in a state-of-art FPGA implementation, then the memory requirement tends to be around about 393 kBytes, which is about 91.6% less than the reported memory requirement of 4.6 Mbytes in used in typical prior art applications. A sample plot for different resolutions, namely 160×120, 288×216, 384×288, 512×384 and 682×512, is shown in FIG. 7, which shows a linear trend for memory versus image size (assuming k=1).

The architecture 10 of FIG. 1 does not perform complex image operations such as filtering, smoothing, Fourier Transform, etc. In particular, only addition and multiplication are used during processing of one embodiment of the architecture 10. The bulk of these operations mainly come from image moments calculations to find the five best-fit ellipses parameters $(x_0, y_0)$, a, b, and $\alpha$ of the elliptical fit approximation, plus the union-find labeling process 50 (FIG. 5). The remainder of the operations are mainly assignment and comparison such as those executed during an intensity thresholding of the intensity image into binary image.

Figure 7:
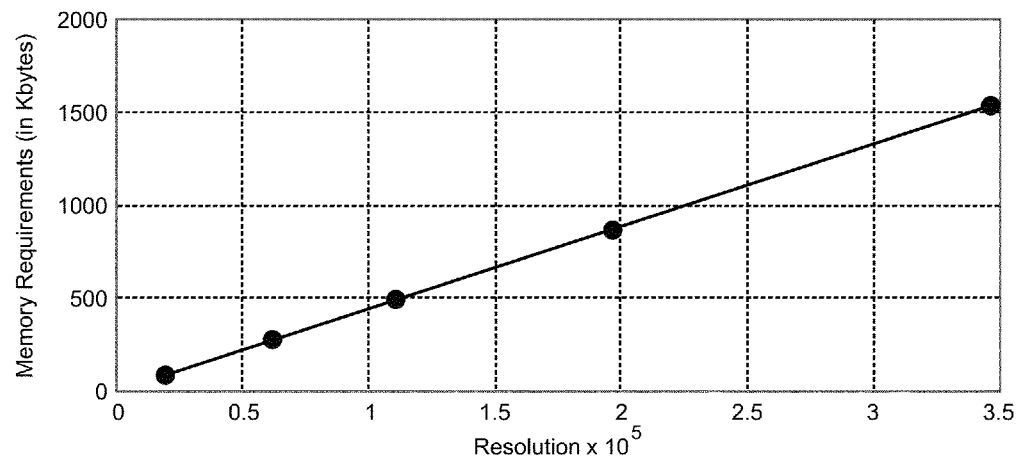
FIG. 7 is a graph of memory requirements of the architecture versus intensity image resolution.
Figure 8:
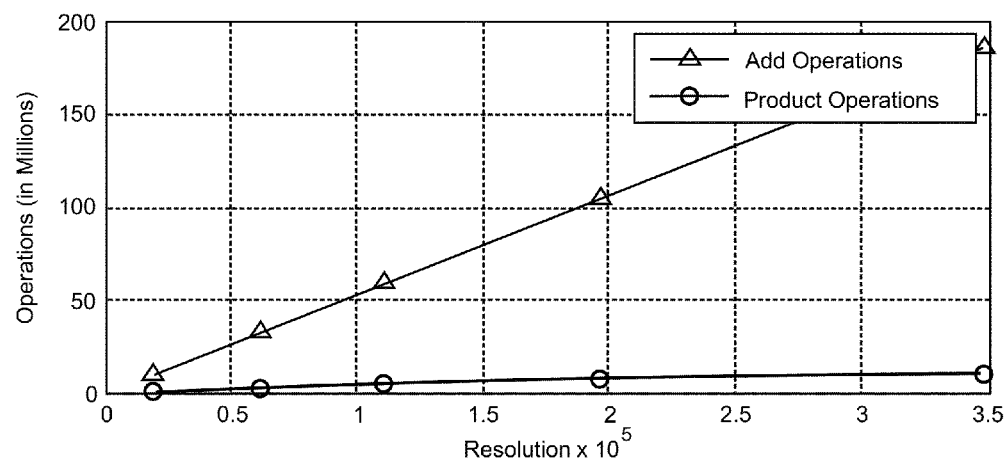
FIG. 8 is a graph of add and product operations for the architecture versus intensity image resolution.
Figures 9, 10:
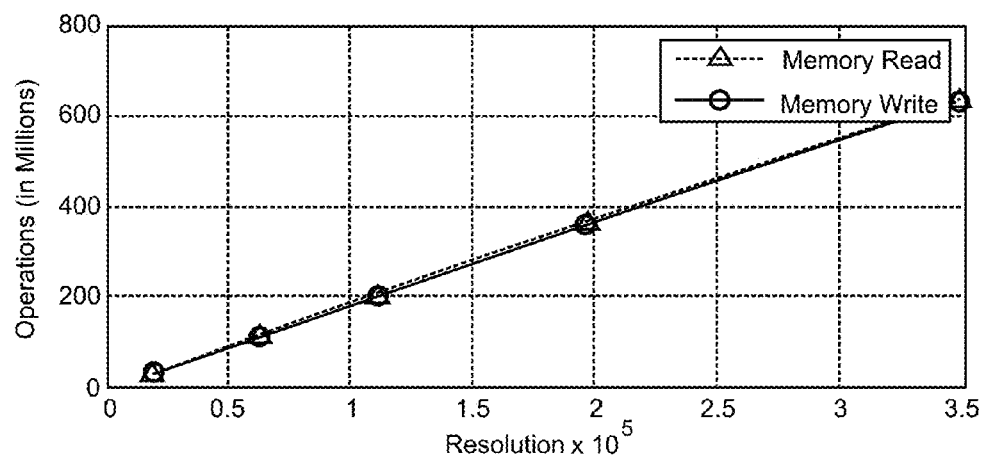
FIG. 9 is a graph of memory reads and writes operations for the architecture versus intensity image resolution.
FIG. 10 is a table of the SOC architecture requirements summary.

In particular, FIG. 7 is a plot of add operations and product operations versus resolution, whereas FIG. 8 is a plot of memory read and memory write operations versus resolution. The test image (FIG. 3), at different resolutions, 160×120, 288×216, 384×288, 512×384 and 682×512 was used to generate the plots shown in FIG. 7 and FIG. 8. FIG. 10 is a table that lists requirements summary an exemplary embodiment of SOC architecture 10 (FIG. 1). The exemplary requirements summary was produced using the same test image to generate FIGS. 7 and 8.

Those skilled in the art will recognize improvements and modifications to the embodiments of the present disclosure. All such improvements and modifications are considered within the scope of the concepts disclosed herein and the claims that follow.

What is claimed is:

1. An architecture for real-time extraction of maximally stable extremal regions (MSERs) comprising a communication interface and processing circuitry configured in hardware to in real-time:
   receive a data stream of an intensity image via the communication interface;
   provide labels for image regions within the intensity image that match a given intensity threshold;
   find extremal regions within the intensity image based upon the labels; and
   determine MSER ellipses parameters based on the extremal regions and MSER criteria.

2. The architecture of claim 1 wherein the MSER criteria include a nested MSER tolerance value.

3. The architecture of claim 2 wherein the MSER criteria further include a minimum MSER area, a maximum MSER area, and an acceptable growth rate value for MSER area.

4. The architecture of claim 1 wherein the MSER ellipses parameters include a center of gravity, a major axis length, a minor axis length, and an angle of the major axis length with respect to a horizontal axis.

5. The architecture of claim 1 wherein the processing circuitry includes MSER moments calculator hardware configured to calculate MSER moments.

6. The architecture of claim 5 wherein the processing circuitry further includes elliptical fit approximator hardware configured to receive MSER moments from the MSER moments calculator hardware and fit an MSER ellipse to an extremal region based upon the MSER moments.

7. The architecture of claim 1 wherein the processing circuitry includes union-find hardware configured to provide the labels for the image regions within the intensity image that match the given intensity threshold.

8. The architecture of claim 7 wherein the processing circuitry includes extremal region find hardware that is configured to receive the labels for the image regions and find extremal regions based upon the labels for the image regions.

9. The architecture of claim 8 wherein the extremal region find hardware is configured to find extremal regions using a mathematical relationship $q(t)=|Q(t+\Delta)\backslash Q(t-\Delta)|/|Q(t)|$, where each extremal region's cardinality, $|Q(t)|$ is a function of an intensity threshold t.

10. The architecture of claim 1 wherein the processing circuitry includes MSER selector hardware configured to automatically select MSERs based upon the MSER criteria.

11. An architecture for real-time extraction of maximally stable extremal regions (MSERs) comprising:
    intensity image process hardware that receives a data stream of an intensity image and outputs labels for image regions within the intensity image that match a given intensity threshold;
    extremal regions find hardware that receives the labels for the intensity image and finds extremal regions within the intensity image; and
    MSER process hardware receive that receives MSER criteria and outputs MSER ellipses parameters based upon the extremal regions.

12. The architecture of claim 11 wherein the MSER criteria include a nested MSER tolerance value.

13. The architecture of claim 12 wherein the MSER criteria further include a minimum MSER area value, a maximum MSER area value, and an acceptable growth rate value for MSER areas.

14. The architecture of claim 1 wherein the MSER ellipses parameters include a center of gravity, a major axis length, a minor axis length, and an angle of the major axis length with respect to a horizontal axis.

15. The architecture of claim 11 wherein the intensity image process hardware includes union-find hardware that labels region seeds.

16. The architecture of claim 11 wherein the extremal regions find hardware finds extremal regions using a mathematical relationship $q(t)=|Q(t+\Delta)\backslash Q(t-\Delta)|/|Q(t)|$, where each extremal region's cardinality, $|Q(t)|$ is a function of an intensity threshold t.

17. The architecture of claim 11 wherein the intensity image process hardware includes union-find hardware that provides the labels for the image regions within the intensity image that match a given intensity threshold.

18. The architecture of claim 17 wherein the intensity image process hardware further includes labeled region seeds updater/unifier hardware that prevents a seed that is a first pixel location within the intensity image from being stored in a seed list, if the seed is presently stored in the seed list.

19. The architecture of claim 18 further including region map updater hardware that stores a value of $Q(t+\Delta)$, $Q(t)$, and $Q(t-\Delta)$ for each seed, where t is an intensity threshold and $\Delta$ is an increment of the intensity threshold t.

20. The architecture of claim 11 wherein the intensity image process hardware, the extremal regions find hardware, and the MSER process hardware are fabricated on a single application specific integrated circuit (ASIC).

21. The architecture of claim 11 wherein the intensity image process hardware, the extremal regions find hardware and the MSER process hardware are implemented on a single field programmable gate array (FPGA).

22. A method for real-time extraction of maximally stable extremal regions (MSERs) via processing circuitry comprising:
    receiving a data stream of an intensity image via a communication interface in communication with the processing circuitry;
    generating labels for image regions within the intensity image that match a given intensity threshold in real-time via the processing circuitry;
    finding extremal regions within the intensity image based upon the labels in real-time via the processing circuitry; and
    determining MSER ellipses parameters based on the extremal regions and MSER criteria in real-time via the processing circuitry.

23. The method for real-time extraction of maximally stable extremal regions (MSERs) via the processing circuitry of claim 22 wherein the MSER criteria include a nested MSER tolerance value.

24. The method for real-time extraction of maximally stable extremal regions (MSERs) via the processing circuitry of claim 23 wherein the MSER criteria further include a minimum MSER area, a maximum MSER area, and an acceptable growth rate value for MSER areas.

25. The method for real-time extraction of maximally stable extremal regions (MSERs) via the processing circuitry of claim 22 wherein the MSER ellipses parameters include a center of gravity, a major axis length, a minor axis length, and an angle of the major axis length with respect to a horizontal axis.

26. The method for real-time extraction of maximally stable extremal regions (MSERs) via the processing circuitry of claim 22 wherein the processing circuitry includes MSER moments calculator hardware configured to calculate MSER moments.

27. The method for real-time extraction of maximally stable extremal regions (MSERs) via the processing circuitry of claim 26 wherein the processing circuitry further includes elliptical fit approximator hardware configured to receive MSER moments from the MSER moments calculator hardware and fit an MSER ellipse to an extremal region based upon the MSER moments.

28. The method for real-time extraction of maximally stable extremal regions (MSERs) via the processing circuitry of claim 22 wherein the processing circuitry includes union-find hardware configured to provide the labels for the image regions within the intensity image that match a given intensity threshold.

29. The method for real-time extraction of maximally stable extremal regions (MSERs) via the processing circuitry of claim 28 wherein the processing circuitry includes extremal region find hardware that is configured to receive the labels for the image regions and find extremal regions based upon the labels for the image regions.

30. The method for real-time extraction of maximally stable extremal regions (MSERs) via the processing circuitry of claim 29 wherein the extremal region find hardware is configured to find extremal regions using a mathematical relationship $q(t)=|Q(t+\Delta)\backslash Q(t-\Delta)|/|Q(t)|$, where each extremal region's cardinality, $|Q(t)|$ is a function of an intensity threshold t.

31. The method for real-time extraction of maximally stable extremal regions (MSERs) via the processing circuitry of claim 22 wherein the processing circuitry includes MSER selector hardware configured to automatically select MSERs based upon the MSER criteria.

* * * * *